United States Patent [19]

Ulug

[11] Patent Number: 4,667,322
[45] Date of Patent: May 19, 1987

[54] METHOD AND APPARATUS FOR LOCAL AREA NETWORKS

[75] Inventor: Mehmet E. Ulug, Schenectady, N.Y.

[73] Assignee: General Electric Company, Schenectady, N.Y.

[21] Appl. No.: 733,025

[22] Filed: May 13, 1985

[51] Int. Cl.[4] .............................................. H04J 3/02
[52] U.S. Cl. ........................................ 370/85; 370/89
[58] Field of Search ............................ 370/85, 89, 86; 340/825.05, 826.06, 825.5

[56] References Cited

U.S. PATENT DOCUMENTS

| | | | |
|---|---|---|---|
| 4,293,948 | 10/1981 | Soderblom | 370/89 |
| 4,459,588 | 7/1984 | Grow | 370/89 |
| 4,510,599 | 4/1985 | Ulug | 370/85 |
| 4,517,670 | 5/1985 | Ulug | 370/85 |
| 4,556,974 | 12/1985 | Kozlik | 370/85 |

Primary Examiner—Douglas W. Olms
Assistant Examiner—Kenneth I. Rokoff
Attorney, Agent, or Firm—Richard V. Burgujian; James C. Davis, Jr.; Paul R. Webb, II

[57] ABSTRACT

An improved method for transmitting messages from the buffers of a bus interface unit participating in a local area network is disclosed wherein the bus interface units are permitted to completely empty their buffers upon each possession of the token and thereby decrease the mean bus waiting time of the network. Further, to optimize network bus waiting time while maintaining an upper limit on BIU service time and thereby guaranteeing each bus interface unit of the network one opportunity to transmit during this upper limit time interval, each bus interface unit of the network monitors the BIU service time to determine when this time reaches the upper limit time interval and, thereafter, limits the quantum of information transmitted from its buffer to thereby prevent the BIU service time from increasing beyond the upper limit time interval.

7 Claims, 4 Drawing Figures

METHOD AND APPARATUS FOR LOCAL AREA NETWORKS

BACKGROUND OF THE INVENTION

The present invention is directed in general toward local area networks (LANs) and, in particular, to token passing LANs. Local area networks are becoming more and more commonplace in today's society and with this widespread acceptance and usage of these networks comes the necessity to improve their overall speed and efficiency. Many factors are taken in account when judging the effectiveness of LANs. Among these factors are bus or waiting time which, as used herein, refers to the length of time a bus interface unit (BIU) must store a particular message in its buffer memory before gaining access to the bus for transmission of that message.

Another factor is bus utilization which refers to the percentage of time the transmission bus is being used for the transmission of data between users. Bus utilization does not include the percentage of time the bus is being used for transmission of signals to implement the network protocol, e.g., transmission of the token. Bus waiting time increases and bus utilization is decreased, when the token is passed to BIUs having no messages, or data, to transmit.

Also to be considered as an environment of LANs is the packet arrival rate which refers to the rate at which messages arrive at the bus interface unit to be transmitted in the network.

Still another factor to be evaluated in judging the effectivenss of LANs is BIU service time which is used herein to refer to the time which passes between successive opportunities for a given BIU to place a message on the transmision bus.

Yet another factor used in judging the operation of a LAN is token rotation time which is used herein to refer to the time it takes the token to traverse the LAN.

Token passing local area networks may be either static or dynamic. Dynamic token passing local area networks are those in which stations may enter and exit the logical ring—the list which prescribes the order in which the token is passed—and thereby may elect to participate in the passing of the token or not. Static token passing local area networks are those in which each bus interface unit of the local area network is always participating in the passing of the token.

Dynamic token passing local area networks improve their bus waiting times and bus utilization by allowing a BIU having no messages to transmit to exit the logical ring. Thus, only active stations participate in passing the token and, consequently, bus waiting time is decreased while bus utilization is increased. Many of these networks, however, incur delays, and therefore increase bus waiting time, in re-establishing the logical ring each time a BIU either exits or enters the ring. Additionally, these networks are subject to extreme increases in mean bus waiting times as the packet arrival rate increases.

Conversely, while static local area networks do not incur delays for entering and exiting stations, these systems require that each station receive the token whether or not that station has messages to transmit. Thus, these systems incur unacceptable delay in bus waiting time during periods where relatively few stations have messages to transmit. Further, like the dynamic token passing network, these systems are subject to extreme increases in mean bus waiting time as the packet arrival rate increases.

Lastly, while it may be advantageous in many applications to employ a dynamic network, some applications are best served by a static network. It is desirable, therefore, to improve the overall bus waiting time of each of these networks.

SUMMARY OF THE INVENTION

The subject invention provides method and apparatus for improving the mean bus waiting time of a token passing local area network (LAN) by allowing in one aspect of the invention, the bus interface units (BIUs) to empty their buffer memory and transmit all messages stored therein each time they receive the token. In accordance with this aspect of the invention, no limitation is placed on the length of time a BIU is permitted to hold the token and, therefore, each BIU is permitted to completely empty its buffer memory before transmitting the token to its successor. This method of operation, it has been observed, provides mean bus waiting times which are less than those provided by single message transmission networks irrespective of the mean packet arrival rate. In addition, this method increases the bus utilization of the LAN as compared to single message systems. However, with this method no upper limit is placed on BIU service time which may become unacceptably high in situations where a large number of BIUs in the network have a high volume of stored messages for transmission.

Therefore, to provide an upper limit on BIU service time while concurrently improving the mean bus waiting time of the network as compared to single message type systems, each BIU which receives the token determines its BIU service time and when this time reaches a preselected high value, the amount of information transmitted by the BIU is reduced. Conversely, during periods when the BIU service time is at a low value, the BIU is allowed to transmit more information. The amount of information transmitted by the BIU may be controlled either by varying the number of messages transmitted or by varying the token holding time. In this manner, the mean bus waiting time may be minimized while concurrently maintaining an upper limit on BIU service time. BIU service time is evaluated according to the invention by determining the time it takes for the token to return to a participating BIU.

Novel apparatus is also disclosed for implementing the methods described herein to improve the mean bus waiting time and bus utilization of a static local area network.

It is, therefore, an object of the present invention to provide method and apparatus for reducing the mean bus waiting time irrespective of mean packet arrival rate of a token passing local area network by permitting each BIU to transmit all of the messages awaiting transmission during its message transmission time.

It is a further object of the present invention to provide method and apparatus for reducing the mean bus waiting time while concurrently placing an upper limit on BIU service time by dynamically altering the quantity of messages transmitted by a BIU as a function of the BIU service time.

It is still another object of the present invention to provide method and apparatus for limiting the number of messages a BIU is permitted to transmit during periods when the token rotation time (and correspondingly the BIU service time) is at an unacceptably high value.

It is still another object of the present invention to provide method and apparatus for allowing a BIU to transmit an unlimited number of messages during periods when the token rotation time is at a low value.

DESCRIPTION OF THE DRAWINGS

The subject matter which is regarded as invention is particularly pointed out in the claims appended hereto. The invention, however, both as to organization and method of practice, may best be understood from a reading of the following detailed description taken in conjunction with the drawings in which:

DETAILED DESCRIPTION OF THE DRAWINGS

The present invention provides method and apparatus for decreasing the bus waiting time and increasing the bus utilization of a token passing local area network (LAN) such as that described in IEEE Project 802 Local Network Standards, Draft C, Section 4 (1982).

Token passing local area networks are well known in the art. Exemplary of these is that described in U.S. Pat. No. 4,464,749 to Ulug, issued Aug. 7, 1984, and assigned to the assignee of the present invention, which is incorporated herein in its entirety.

Figure 1:
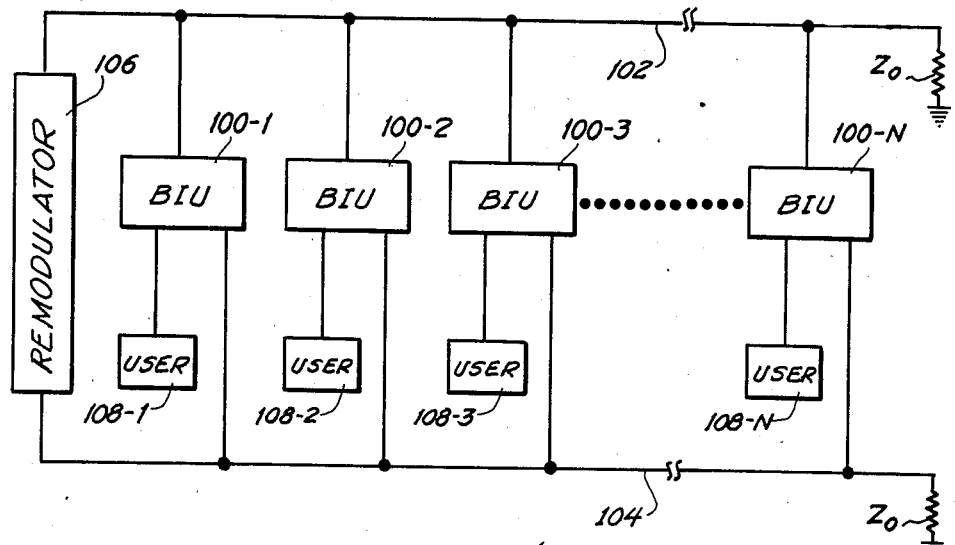
FIG. 1 is an illustrative block diagram of a local area net including the apparatus which is the subject of the present invention.

A local area network capable of implementing the method which is the subject of the present invention is shown in FIG. 1 wherein a plurality of bus interface units (BIUs) 100-1 through 100-N are each connected directly to transmission bus 102 and receive bus 104. Transmission bus 102 and receive bus 104 may each comprise any means for transferring digital information between BIUs 100. Particularly, transmission bus 102 and receive bus 104 may comprise electrical transmission means and/or fiber optic transmission means as is known in the art. Each bus 102 and 104 is properly terminated by its characteristic impedance $Z_o$ as is known in the art. If transmission bus 102 and/or receive bus 104 should comprise optical transmission means, then impedance $Z_o$ would comprise an opaque material as is also known in the art. In the preferred embodiment, transmission bus 102 and receive bus 104 each comprise a CATV cable such as those readily available from the Jerrold Electronics Company.

Transmission bus 102 is coupled to receive bus 104 via a remodulator 106. Remodulator 106 is provided to receive information placed on transmission bus 102 and retransmit this information on receive bus 104. In local area networks where transmission bus 102 and receive bus 104 comprise the same physical cable, remodulator 106 may also comprise a frequency translator to receive information on one frequency and retransmit on another. Devices suitable for use as remodulator 103 are well known in the art. See, e.g., U.S. Pat. No. (U.S. Patent and Trademark application Ser. No. 504,716, filed Jun. 15, 1983) to Ulug and assigned to the assignee of the present invention, which is incorporated herein in its entirety.

Alternatively, transmit bus 102 may comprise a bidirectional bus for both transmitting and receiving information. In this embodiment, remodulator 106 and receive bus 104 are unnecessary. Local area networks which employ bidirectional buses are also known in the art, however, require BIUs different from that of FIG. 2, as will be discussed hereinbelow.

Each BIU 100-1 through 100-N is coupled to a respective user device 108-1 through 108-N for providing a sophisticated interface between the user device and transmission bus 102. User devices 108 may comprise any of a plurality of devices normally found in local area networks, e.g., a personal processing device, a printing device, a memory device, etc. Although each user device 108 is shown as a single discrete element, it will be apparent to those skilled in the art that a plurality of user devices may be coupled to the same BIU for communication with transmission bus 102 and receive bus 104 via that BIU.

Figure 2:
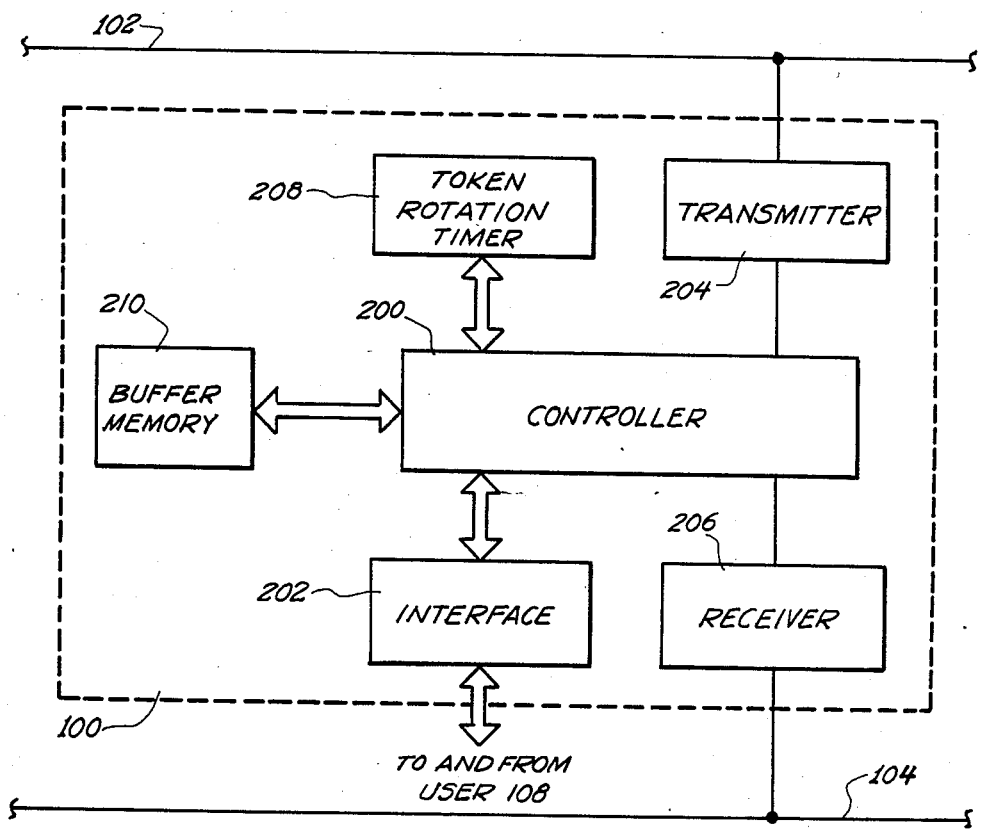
FIG. 2 is a more detailed illustrative block diagram of the bus interface units of FIG. 1.

Referring to FIG. 2, there is shown a more detailed illustrative block diagram of each BIU 100. Therein, each BIU 100 is shown to comprise a controller 200 coupled to communicate to its respective user device 108 (not shown) via an interface 202.

Controller 200 may comprise any element, or combination of elements, capable of controlling the transfer of information between a user 108, transmission bus 102 and receive bus 104. For example, controller 200 may comprise a pair of microprocessors, one for controlling the transfer of information between user 108 and BIU 100, and the other for controlling the transfer of information between BIU 100, transmission bus 102 and receive bus 104. These microprocessors would each be programmed, by methods and apparatus known in the art, to implement the methods described herein for information transfer between users 108 via transmit bus 102 and receive bus 104. Additionally, controller 200 may comprise read only memory, random access memory, timers, latches, comparators, bistable and/or monostables, etc., as may be necessary for adapting the microprocessors for information transfer as described herein.

Interface 202 may comprise any device, or combination of devices, capable of adapting information from user device 108 for use in controller 200 and, conversely, adapting information from controller 200 for use in user device 108.

Controller 200 is also shown coupled to transmit bus 102 and receive bus 104 via transmitter 204 and receiver 206, respectively. Transmitter 204 may comprise any device, or combination of devices, capable of trans-mitting digital information on transmission bus 102 from controller 200. Likewise, receiver 206 may comprise any combination of devices for receiving the digital transmissions provided to receive bus 104 from remodulator 106. In an alternate embodiment, where transmission bus 102 comprises a bidirectional bus for both transmitting and receiving information, both transmitter 204 and receiver 206 would be coupled between controller 200 and transmission bus 102. Further, in this embodiment, transmitter 204 and receiver 206 may comprise a digital transceiver as is known in the art.

Controller 200 is also shown coupled to token rotation timer 208. Token rotation timer 208 is provided to measure the token rotation time of the token, i.e., time interval necessary for the token to completely traverse the local area network. Although the token rotation time interval will vary from network to network depending upon the speed of the network as well as the number of BIUs participating therein, the token rotation time will typically be in the millisecond range. Therefore, timer 208 may comprise any known device, or combination of devices, for measuring time intervals in the millisecond range.

Lastly, controller 200 is shown coupled to buffer memory 210. Buffer memory 210 is provided for temporarily storing a plurality of messages from user 108 to be transmitted on transmission bus 102. Buffer memory 210 may comprise random access memory or any other suitable device for performing the functions as described herein.

It should be noted that while the network for implementing the subject invention is described by reference to a LAN wherein a plurality of bus interface units are coupled to a common transmission bus, the subject invention works equally as well with so-called "ring" local area networks wherein a plurality of bus interface units are serially coupled via a plurality of dedicated connections. Likewise, as mentioned hereinabove, while the invention is described with reference to a local area network having independent transmission and receive buses, the invention works equally as well with local area networks wherein a bidirectional bus is used for both transmission and reception of messages.

In accordance with one aspect of the present invention, mean bus waiting time is minimized and bus utilization is maximized by allowing each BIU of a local area network to completely empty its buffer memory after receiving the token. As mentioned hereinabove, bus waiting time is that time interval which occurs after a BIU receives a particular message to be transmitted until that BIU gains access to transmission bus 102 (FIG. 2) for transmitting that particular message, i.e., the time interval that a particular message must wait in buffer memory 210 before being transmitted. Bus utilization refers to the percentage of time transmission bus 102 is used for transmission of messages or data between BIUs 100 (FIG. 1).

Because prior art token passing local area networks limit to a relatively small value the length of time a BIU is permitted to hold the token to thereby limit the number of messages the BIU is permitted to transmit while in possession of the token, these networks incur extreme mean bus waiting times when the mean packet arrival rate is at a relatively high value.

Figure 4:
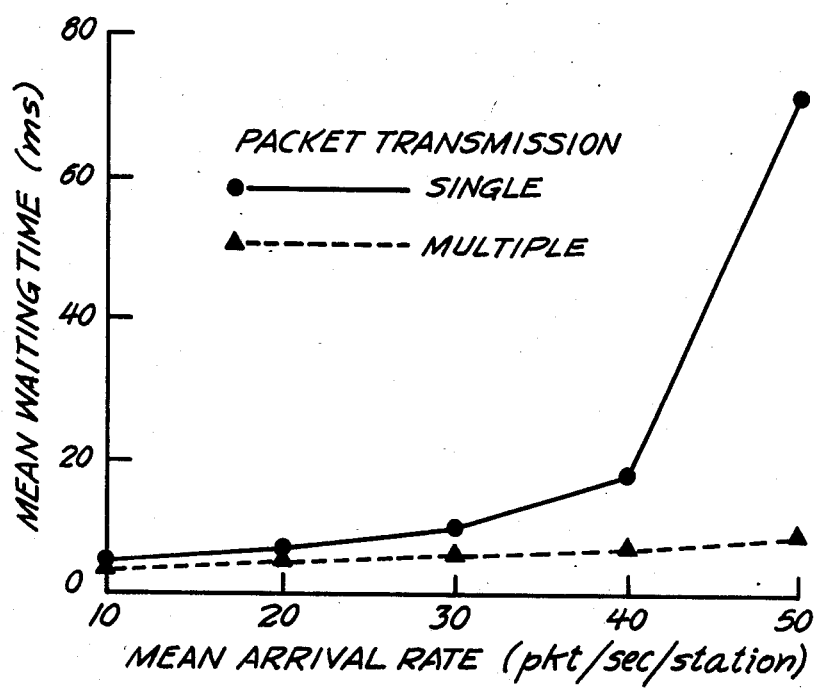
FIG. 4 is a graph illustrating the increase in mean bus waiting time as mean packet arrival rate increases for both prior art methods and the method which is the subject of the present invention.

With reference to FIG. 4 there is shown a graph illustrating the increase in mean bus waiting time as the mean packet arrival rate increases. The solid line represents the graph for prior art local area networks wherein a single transmission is permitted for each possession of the token. Conversely, the dashed line represents multiple packet transmission wherein a BIU is permitted to completely empty its buffer 210 (FIG. 2) during each possession of the token. Data for plotting the graph of FIG. 4 was provided by simulating, using the General Purpose Simulation System (GPSS) language, a fifty station local area network operating at five megabytes per second and having a 175 microsecond token passing time and a 205 microsecond packet service time. As seen therein, single message transmission local area networks incur mean bus waiting times which are greater than those for multiple message transmission networks irrespective of mean packet arrival rate. Further, during intervals when the mean packet arrival rate is at a relatively high value, single message transmission local area networks incur extreme mean bus waiting times. Conversely, local area networks operating under the multiple message transmission method disclosed herein, incur minimal increases in mean bus waiting times as the mean packet arrival rate increases.

In addition to minimizing mean bus waiting times, the present invention maximizes bus utilization by allowing the transmission of many message packets for each transmission of the token. Using the method of the subject invention, the number of data packet trans-missions increases over that of the prior art for the same number of network protocol transmissions thereby decreasing the overhead. Therefore, the amount of time the transmission bus is being used for data packet transmissions relative to the amount of time the bus is being used for network protocol packet transmissions is increased resulting in improved bus utilization.

Thus, in one aspect of the invention, after receiving the token, the bus interface units of the present invention are permitted to completely empty their buffer memory 210 (FIG. 2) before transmitting the token. While this method results in sizable improvements in mean bus waiting times, it may be advisable, and sometimes necessary, to limit the token holding time such that the BIU service time will not exceed a predetermined maximum and, therefore, each BIU will be guaranteed opportunity to transmit once during this predetermined maximum interval.

In order to limit BIU service time while decreasing mean bus waiting time as compared to prior art systems, the BIUs of the subject invention monitor the BIU service time and vary the quantum of information transmitted based on the value thereof. One method for changing the quantum of information transmitted is to vary the token holding time or the time during which any given BIU is permitted to transmit message information. Another is to vary the number of messages which are allowed to be transmitted from a maximum (emptying the entire buffer) to a lower number depending on the determined BIU service time (for systems having message length distributions which are truncated).

A method most easily implemented for monitoring BIU service time is to measure the time it takes for the token to return to a given BIU after being transmitted or token rotation time. Of course, in non-token passing LANs other methods of evaluating BIU service time could be employed. Thus, during intervals of high BIU service time evidenced by a long token rotation time interval in a token passing system, the token holding time is decreased thereby decreasing the quantum of information transmitted while in possession of the token. Conversely, during intervals associated with an acceptable BIU service time, the token holding time is increased thereby increasing the quantum of information transmitted while in possession of the token. A flowchart for implementing the above described method for limiting BIU service time by monitoring token rotation and varying the quantity of information transmitted depending thereon is illustrated in FIG. 3.

Figure 3:
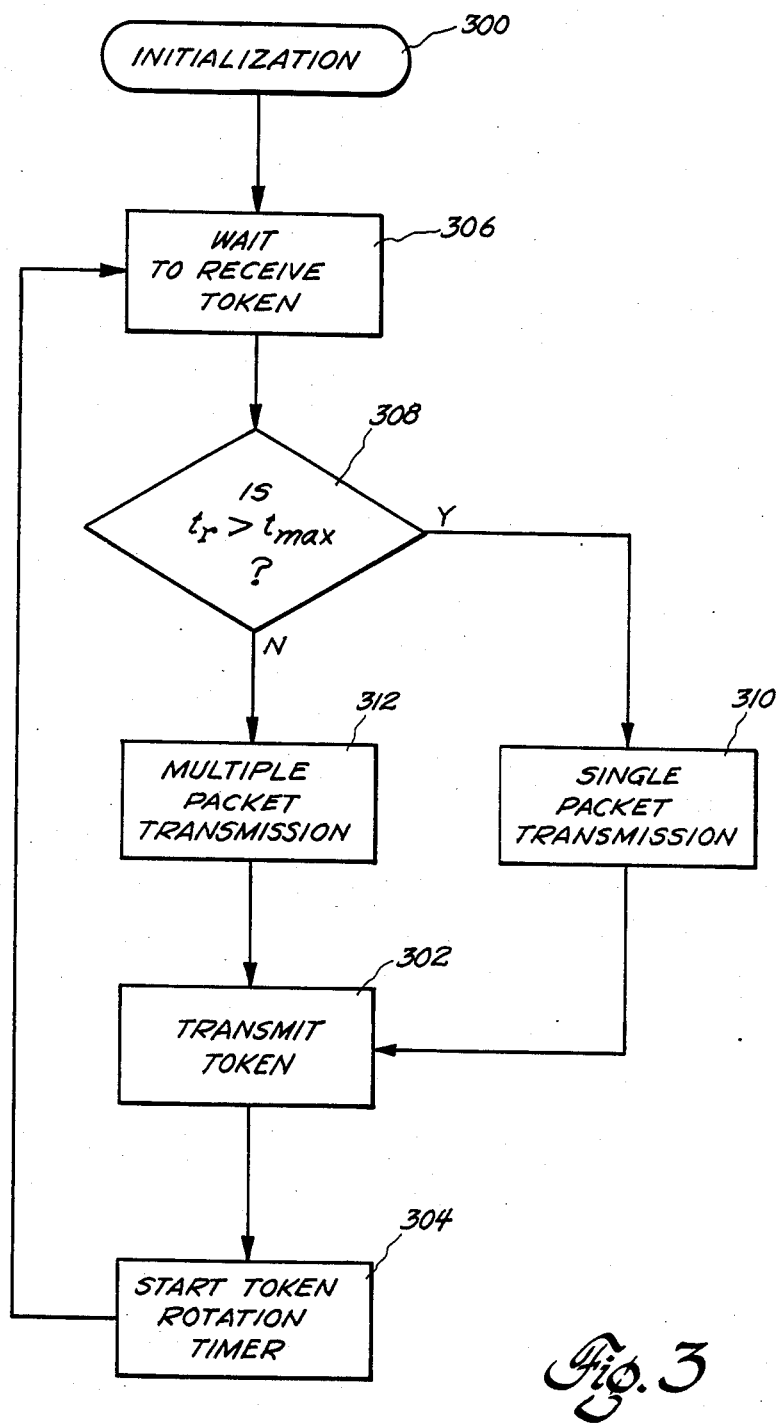
FIG. 3 is a decisional flow diagram illustrating the method by which messages are transmitted in accordance with the present invention.

With reference to FIG. 3, the local area network is initialized in step 300 wherein the logical ring is established and the token passing scheme is initiated. After transmitting the the token, step 302, each BIU starts its token rotation timer, step 304, and thereafter waits to receive the token, step 306. After receiving the token, each BIU determines the token rotation time $t_r$ as measured by token rotation timer 208 (FIG. 2) and, thereafter, determines whether this time interval is greater than a predetermined maximum token rotation time interval $t_{max}$, step 306. The predetermined token rotation time interval $t_{max}$ is chosen to equal the maximum allowable BIU service time. If the measured token rotation time interval is greater than the predetermined maximum token rotation time interval, i.e., $t_r$ is greater than $t_{max}$, then the BIU is permitted to only transmit a single message packet, step 310, before transmitting its token, step 302. Alternatively, if the measured token rotation time interval is less than or equal to the predetermined maximum token rotation time interval, i.e., $t_r$ is less than or equal to $t_{max}$, then the BIU is permitted to completely empty its buffer 210, step 312, before transmitting the token, step 302.

It will be noted that after initialization, during the first rotation of the token, no token rotation is measured and, therefore, no meaningful data will be provided for making the decision of step 306. However, by presetting token rotation timer 208 to either zero or $t_{max}$ during initialization, one can assure either multiple or single message transmission during the first token possession.

Also it is noted that while the method of FIG. 3 is described as either single or multiple message transmission, many varying limitations between these two extremes may be placed on the quantity of information to be transmitted. Also, while each of the methods disclosed herein is described by reference to a token passing local area network, the methods are equally applicable to networks which pass a virtual token, implicit token, or networks where no token is passed at all.

Therefore, while only several presently preferred embodiments of my novel method and apparatus for maintaining a dynamic logical ring in a token passing local area network have been presented in detail herein, many modifications and variations will now become apparent to those skilled in the art. It is my intent, therefore, to be limited only by the scope of the appended claims and not by specific details presented herein.

What is claimed is:

1. In a local area network (LAN) wherein a plurality of participating bus interface units (BIUs) are coupled for intercommunication such that each said BIU is permitted to transmit message information in accordance with a network protocol, and wherein each said BIU includes a buffer memory for temporarily storing said information to be transmitted, a method for transmitting said information comprising the steps of:
   (a) each said BIU determining its BIU service time, said service time being the time since the BIU last had access to the bus for transmitting information; and
   (b) if said time is at or below a preselected value, transmitting all or up to a first quantum of said stored information and, if said time is above said preselected value, transmitting less than all or up to a second quantum of information, said second quantum being smaller than said first.

2. The method as recited in claim 1 wherein, in accordance with said network protocol, a token is passed between said BIUs such that each said BIU is permitted to transmit while in possession of said token, said step of determining said time comprising the step of determining the token rotation time, said token rotation time being the time interval necessary for said token to completely transverse said local area network.

3. The method as recited in claim 2 wherein said step of transmitting information comprises the step of varying the token holding time, said token holding time being the time interval that each said BIU is permitted to possess said token, a relatively small token holding time permitting transmission of a small quantum of information, a relatively larger token holding time permitting transmission of a larger quantum of information.

4. The method as recited in claim 1 wherein said step of transmitting information comprises the step of varying the number of stored messages transmitted by each BIU such that as said BIU service time increases the messages transmitted decreases.

5. The method as recited in claim 1 wherein the step of transmitting information comprises the step of varying the maximum transmission time during which said BIU may transmit messages, such that as said BIU service time increases the messages transmitted decreases.

6. The method as recited in claim 3 wherein said step of varying said token holding time comprises the substeps of:
   (a) comparing said token rotation time to said predetermined value;
   (b) if said token rotation time is greater than said predetermined value, allowing only a single transmission for each possession of said token; and
   (c) if said token rotation time is less than or equal to said predetermined value, allowing each said BIU to transmit all of said stored information for each possession of said token.

7. A bus interface unit (BIU) for interfacing a user with a transmission bus of a token passing local area network, said apparatus comprising:
   (a) transceiver means for transmitting and receiving information to and from said bus;
   (b) interface means for transmitting and receiving information to and from said user;
   (c) buffer memory means for temporarily storing information received from said user to be transmitted in said network;
   (d) control means including means for measuring the rotation time of a token, said token rotation time being the time interval necessary for said token to traverse said bus, and means for controlling the flow of information to and from said transceiver, interface and buffer memory means to permit the transmission of an unlimited quantum of information stored in said buffer memory when said token rotation time is below a predetermined value and to decrease the quantum of information transmitted from said buffer memory when said token rotation time exceeds said predetermined value.

* * * * *